US012362848B2

(12) United States Patent
Paul

(10) Patent No.: US 12,362,848 B2
(45) Date of Patent: Jul. 15, 2025

(54) METHOD FOR TRANSMITTING DATA PACKETS

(71) Applicant: Endress+Hauser SE+Co. KG, Maulburg (DE)

(72) Inventor: Tobias Paul, Schopfheim (DE)

(73) Assignee: Endress+Hauser SE+Co. KG, Maulburg (DE)

(*) Notice: Subject to any disclaimer, the term of this patent is extended or adjusted under 35 U.S.C. 154(b) by 240 days.

(21) Appl. No.: 17/904,463

(22) PCT Filed: Jan. 28, 2021

(86) PCT No.: PCT/EP2021/051995
§ 371 (c)(1),
(2) Date: Aug. 17, 2022

(87) PCT Pub. No.: WO2021/165012
PCT Pub. Date: Aug. 26, 2021

(65) Prior Publication Data
US 2023/0092222 A1    Mar. 23, 2023

(30) Foreign Application Priority Data
Feb. 19, 2020    (DE) .................. 10 2020 104 319.8

(51) Int. Cl.
*H04J 3/06*      (2006.01)
*H04W 4/02*    (2018.01)

(52) U.S. Cl.
CPC .......... *H04J 3/0667* (2013.01); *H04J 3/0647* (2013.01); *H04W 4/02* (2013.01)

(58) Field of Classification Search
CPC ....... H04J 3/0667; H04J 3/0647; H04W 4/02; H04W 4/38; H04L 67/52; H04L 67/12;
(Continued)

(56) References Cited

U.S. PATENT DOCUMENTS

2002/0140867 A1* 10/2002 Weiss .................. H04N 21/242
    348/E5.093
2014/0348154 A1* 11/2014 Hofman ................. G01D 9/28
    370/350

(Continued)

FOREIGN PATENT DOCUMENTS

CN    207491221 U    6/2018
DE    102014117894 A1    6/2016

OTHER PUBLICATIONS

Mudumbai et al. IEEE—Communications Magazine Distributed Transmit Beamforming: Challenges and Recent Progress; Feb. 2009 (Year: 2009).*

(Continued)

*Primary Examiner* — Rina C Pancholi
(74) *Attorney, Agent, or Firm* — Gil M. Repa; Endress+Hauser (USA) Holding, Inc.

(57) ABSTRACT

A method for wirelessly transmitting data packets within a measuring system from multiple field devices to a superordinate unit via a wireless interface of the each device includes distributing the data packet to the field devices; synchronizing the wireless interfaces of the field devices such that the wireless interfaces transmit with a defined phase shift relative to one another in each particular case; and transmitting the data packet to the superordinate unit via the wireless interfaces of the at least two field devices in synchronized fashion. This allows the data packet to be received by the superordinate unit with increased transmission reliability according to the invention. This ensures the data transmission between one of the field devices and the superordinate unit without a repeater or other added complexity even when there are individual obstacles.

8 Claims, 1 Drawing Sheet

(58) Field of Classification Search
CPC ........... H04L 2012/40208; H04L 2012/40221; H04L 2012/4026
See application file for complete search history.

(56) References Cited

U.S. PATENT DOCUMENTS

| | | | |
|---|---|---|---|
| 2015/0131411 A1* | 5/2015 | Gudgel | H04R 1/406 367/129 |
| 2016/0161934 A1* | 6/2016 | Haase | G05B 19/05 700/19 |
| 2019/0190577 A1 | 6/2019 | Wang et al. | |

OTHER PUBLICATIONS

Mudumbai, et al, Distributed Transmit Beamforming: Challenges and Recent Progress, Cooperative and Relay Networks, IEEE Communications Magazine, Feb. 2009, 0163-6804/09, pp. 102-110.

* cited by examiner

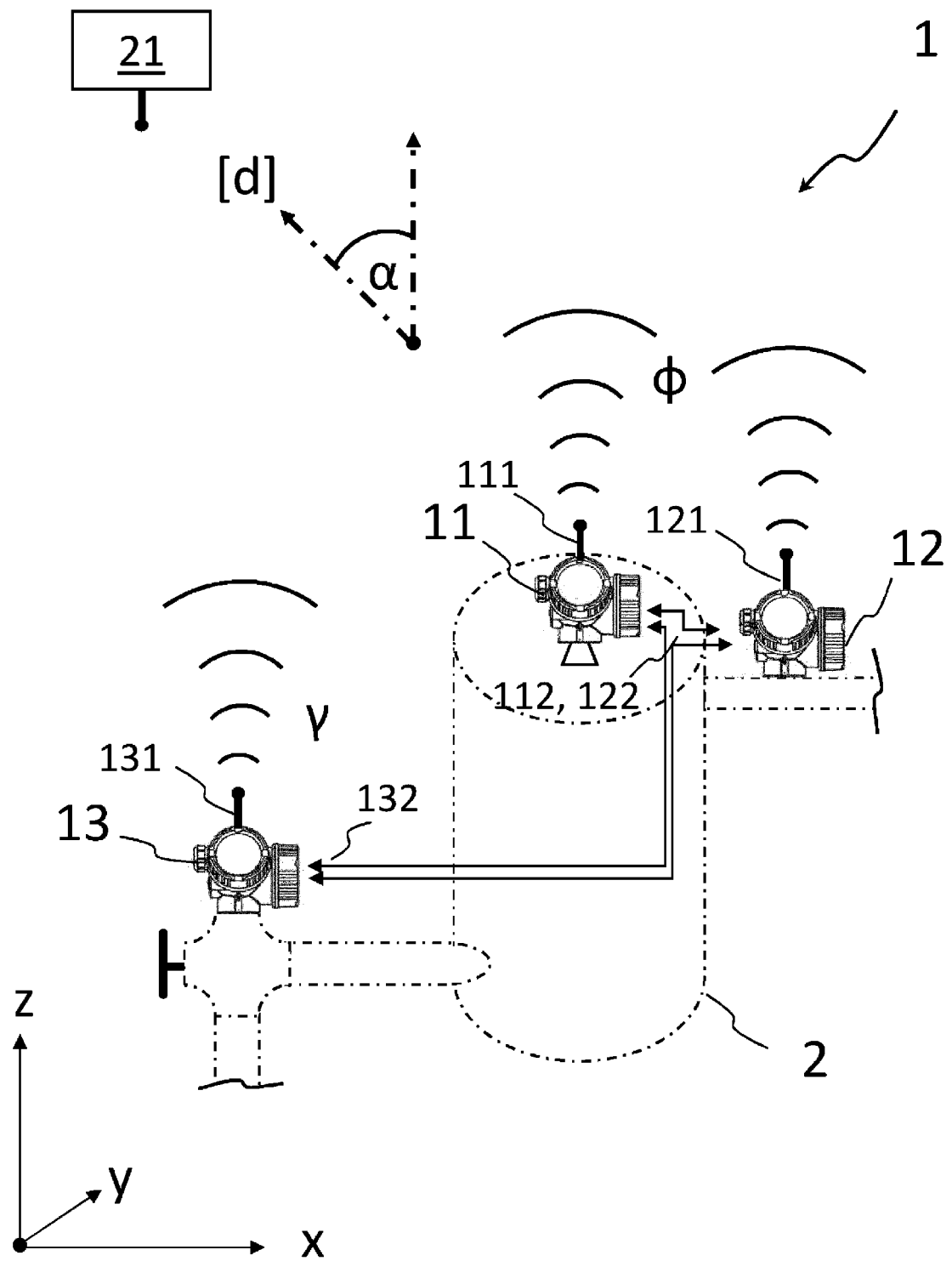

METHOD FOR TRANSMITTING DATA PACKETS

CROSS-REFERENCE TO RELATED APPLICATIONS

The present application is related to and claims the priority benefit of DPMA Patent Application No. 10 2020 104 319.8, filed on Feb. 19, 2020, and International Patent Application No. PCT/EP2021/051995, filed on Jan. 28, 2021, the entire contents of which are incorporated herein by reference.

TECHNICAL FIELD

The invention relates to a method for transmitting data packets within a measuring system.

BACKGROUND

In automation technology, especially for process automation, field devices that serve to detect various measured variables are often used. The measured variable to be determined may, for example, be a fill level, a flow, a pressure, the temperature, the pH value, the redox potential, a conductivity, or the dielectric value of a medium in a process plant. In order to detect the corresponding measured values, the field devices each comprise suitable sensors or are based on suitable measuring principles. A variety of such types of field devices is produced and marketed by the Endress+Hauser group of companies.

In the respective process plant, the individual field devices are interconnected within a measuring system with a superordinate unit in order to be able to coordinate the corresponding process variables with suitable actuators, such as heating elements, stirrers, valves or pumps for inlets and outlets. In this context, the term "superordinate unit" is understood to include not only programmable logic controllers (PLCs) but also remote I/Os or edge devices (electrical interfaces) or, in general, devices as well as handheld devices that are used at the field level.

For communication within the measuring system, the field devices are usually not only connected in each particular case to the superordinate unit but also to each other, for example via a PROFIBUS, a (wireless) HART or an industrial Ethernet interface. In this case, communication can be implemented on the basis of a star, mesh, or net topology, for example.

Since the individual field devices within the process plant are often also arranged in locations that are difficult to access, the communication of the field devices to the superordinate unit within the measuring system preferably takes place via wireless interfaces, such as according to the wireless-HART, Bluetooth, or a WLAN protocol.

Via them, the detected measured values can be transmitted in respective data packets, for example. However, other information relevant to operations of the field device can also be communicated by means of corresponding data packets, such as status information, calibration data, or comparable information. However, especially in the case of wireless communication, the connection of individual field devices to the superordinate unit can be disturbed by installations in the signal path. Depending on the situation, this can lead to a dangerous situation in the process plant.

SUMMARY

The invention is therefore based on the object of providing a method that enables a reliable connection of all field devices to the superordinate unit.

The invention achieves this object by a method for wirelessly transmitting at least one data packet within a measuring system of at least two field devices via a wireless interface to a superordinate unit in each particular case. The method comprises the following method steps:

distributing the data packet to all field devices, starting from at least one of the field devices,
  synchronizing the wireless interfaces of the field devices such that the wireless interfaces transmit with a defined phase shift relative to one another in each particular case,
  transmitting the data packet to the superordinate unit via the wireless interfaces of the at least two field devices in synchronized fashion, and
  receiving the data packet by the superordinate unit.

By distributing the data packet among all field devices and the common, synchronized transmission of the data packet, the transmission power, and thus the transmission reliability, is increased according to the invention.

Within the framework of the invention, it is not firmly specified by means of which topology the field devices are connected to one another in order to distribute the data packet among one another starting from one of the field devices. For example, the field devices can be interconnected in such a way that the data packet is distributed among the field devices according to a star, mesh, or net topology. The synchronization can also take place via the wireless interfaces themselves, for example according to the IEEE 1588 standard. In addition, however, it is also conceivable for the wireless interfaces to be synchronized via any wired interfaces of the field devices, for example again by means of the IEEE 1588 standard.

The method according to the invention can be expanded in such a way that the relative positions of the field devices and of the superordinate unit with respect to one another are determined. For determining the relative positions, the field devices and the superordinate unit can comprise a GNSS module in each particular case, for example. As an alternative to GNSS, the field devices or the superordinate unit can also be designed such that the relative positions can be determined by means of triangulation. For this purpose, the signal transit time or the signal strength and thereby the distance between the field devices or to the superordinate unit required for triangulation can, for example, be determined by a transit time measurement of a corresponding measurement signal via the wireless interfaces.

The determination of the positions can be used according to the invention in order to synchronize the wireless interfaces of the field devices to such phase shifts according to the "beamforming" principle that the data packet to be emitted is emitted with a common main radiation pattern, which is directed in the direction of the superordinate unit. This results in a further improvement of the transmission reliability.

A corresponding measuring system suitable for carrying out the method according to the invention according to one of the preceding design variants has to comprise at least the following components:

at least two field devices each having
    a synchronizable wireless interface,
    a control unit designed to
      synchronize the respective wireless interface with the other wireless interface(s) accordingly,
      coordinate the distribution of the data packet among the field devices, and
      control the synchronized transmission of the data packet via the respective wireless interface, and a superordinate unit designed to receive the data packet. Of course, the method according to the invention can be applied to any number of field devices of a measuring system.

Within the context of the invention, the terms "unit" and "interface" are understood to mean, in principle, all electronic circuits that are designed to be suitable for the planned intended purpose. Depending on the requirement, it can therefore be an analog circuit for generating or processing corresponding analog signals. However, it may also be a digital circuit, such as an FPGA, or a storage medium in interaction with a program. In this case, the program is designed to perform the corresponding method steps or to apply the necessary calculation operations of the respective unit. In this context, various electronic units of the fill-level measuring device in the sense of the invention may potentially also access a common physical memory or be operated by means of the same physical digital circuit.

The protocol with which the data packet is transmitted is not prescribed in a fixed manner within the framework of the invention. For example, the wireless interfaces may be designed to transmit the data packet according to the wireless-HART, Bluetooth, or a WLAN protocol. The superordinate unit is to be correspondingly designed to receive the data packet on the basis of the corresponding protocol.

In addition to the wireless interface, the at least two field devices can each also comprise a wired interface in order to synchronize the wireless interfaces and/or to distribute the data packet to the field devices, for example. In this case, the wired interfaces can be based on the PROFIBUS, HART, or an industrial Ethernet protocol.

BRIEF DESCRIPTION OF THE DRAWING

The invention is explained in more detail with reference to the following FIGURE. The following is shown:

FIG. 1 shows a measuring system with three field devices in a process plant.

DETAILED DESCRIPTION

For the general understanding of the method according to the invention, FIG. 1 shows an exemplary measuring system 1 that serves for monitoring a process plant 2, such as a chemical reactor. For this purpose, the exemplary measuring system 1 comprises as field devices a flowmeter 12 at an inlet of the reactor 2, a fill-level measuring device 11 on the reactor 2 itself, and a temperature measuring device 13 at an outlet of the reactor 2. In this case, the field devices 11, 12, 13 measure the corresponding measured values in each particular case at an individually adjustable measurement rate, e.g., between 1 measurement per minute and 1000 measurements per second.

The field devices 11, 12, 13 shown in FIG. 1 are connected to one another via corresponding wired interfaces 112, 122, 132. Since each of the field devices 11, 12, 13 is connected to each other field device 11, 12, 13 in each particular case via the wired interface 112, 122, 132, the connection of the field devices 11, 12, 13 via the wired interfaces 112, 122, 132 corresponds to a mesh topology in the exemplary embodiment shown in FIG. 1. HART, PROFIBUS, or an industrial Ethernet can be implemented as a protocol for communication via the wired 112, 122, 132 interfaces. In spite of a wired design of the field devices 11, 12, 13, the latter can accordingly be operated by means of a battery so that separate cabling does not have to be laid for this purpose.

In the design variant shown in FIG. 1, the measuring system 1 comprises, in addition to the field devices 11, 12, 13, a superordinate unit 21 to which the field devices 11, 12, 13 are also connected. In this case, the superordinate unit 21 can be the process control system of the process plant, for example in the form of a "PLC." For communication with the superordinate unit 21, the field devices 11, 12, 13 and the superordinate unit 21 each comprise a wireless interface 111, 121, 131, wherein wireless-HART, Bluetooth, or WLAN can be implemented as the transmission protocol.

Via the wireless interfaces 111, 121, 131, the measured values measured by the field devices 11, 12, 13 can in particular be transmitted by means of corresponding data packets [d]. On the basis of the data packets [d] obtained, the superordinate unit 21 can, for example, in turn control corresponding pumps or valves at the outlet or at the inlet of the reactor in order to control the fill level or the reaction. However, the transmission of the measured values or of the data packets [d] can then be at risk if individual interfaces of the interfaces 111, 121, 131 cannot transmit with sufficiently high power or if the distance to the superordinate unit 21 is too great. Obstacles between one of the field devices 11, 12, 13 and the superordinate unit 21 can also endanger the data transmission.

According to the invention, the data packet [d] is therefore transmitted with the respective measured values from one of the field devices 11, 12, 13 to all further field devices 11, 12, 13. Subsequently, this data packet [d] is transmitted to the superordinate unit 21 via the wireless interfaces 111, 121, 131 of all field devices 11, 12, 13. Starting from the wireless interfaces 111, 121, 131, the data packet [d] is transmitted in synchronized fashion in such a way that the data packet [d] is transmitted in each particular case with a defined phase shift $\varphi, \gamma$ between the wireless interfaces 111, 121, 131 with respect to the common transmission frequency. The prior synchronization of the wireless interfaces 111, 121, 131 to one another can take place in the exemplary embodiment shown in FIG. 1 either directly via the wireless interfaces 111, 121, 131 or via the wired interfaces 112, 122, 132. In both cases, the synchronization can take place, for example, on the basis of the IEEE 1588 standard.

In the simplest case, the wireless interfaces 111, 121, 131 can be synchronized to phase shifts $\varphi, \gamma$ of 0° in order to increase the total transmission power or to bypass individual obstacles so that the reception of the data packet [d] by the superordinate unit 21 is ensured. However, the transmission method according to the invention can be developed primarily in that the relative positions x, y, z of the field devices 11, 12, 13 and of the superordinate unit 21 relative to one another are included. In this case, the relative positions x, y, z can be determined, for example, in each particular case by means of a GNSS module implemented in the field devices 11, 12, 13 and in the superordinate unit 21.

However, it is also conceivable for the relative positions x, y, z between the devices 11, 12, 13, 21 to be determined by means of triangulation. For this purpose, the distances between the individual devices 11, 12, 13, which must be known for the triangulation-based determination of the relative positions x, y, z, can be determined, for example, by determining the signal transit times or the signal strength between the individual wireless interfaces 111, 121, 131. It is also conceivable in this connection to perform the triangulation by means of transit time/signal strength measurement with respect to peripheral devices, such as mobile radio towers or WLAN routers. Alternatively, it is moreover possible to manually input the positions on the field devices 11, 12, 13 and of the superordinate unit 14, provided that the installation locations are known with sufficient precision.

On the basis of the determined positions x, y, z, the field devices 11, 12, 13 can in turn be synchronized to one another to such phase shifts φ, γ that the data packet [d] is emitted with a common main radiation pattern, which is directed in the direction of the superordinate unit 21, as indicated schematically in FIG. 1. This type of transmission is also known under the term "beamforming." With beamforming, the phase shifts φ, γ are to be set according to the formula $$\alpha \sim \arcsin(\varphi, \gamma)$$

so that the correct angle α arises for the total main radiation pattern of all wireless interfaces 111, 121, 131 in the direction of the superordinate unit 21 (with respect to the main radiation pattern of the individual antenna in each particular case). In contrast to the schematic representation in FIG. 1, this formula applies approximately under the assumption that the distances between the individual field devices 11, 12, 13 are small in comparison to the distance to the superordinate unit 21.

Within the framework of the invention, the method of beamforming is particularly advantageous in that the data packet [d] is transmitted in a targeted manner in the direction of the superordinate unit 21. Thus, not only is the transmission reliability of the data packet [d] further increased, but the transmission powers of the individual wireless interfaces 111, 121, 131 can also be reduced, if necessary, in order to minimize the power consumption of the measuring system 1 as a whole.

The invention claimed is:

1. A method for wirelessly transmitting a data packet within a measuring system, the method comprising:
   providing the measuring system including at least two field devices and a superordinate unit, wherein each of the at least two field devices and the superordinate unit includes a wireless interface;
   distributing the data packet to the at least two field devices;
   determining relative positions of the at least two field devices and of the superordinate unit with respect to one another;
   synchronizing the wireless interfaces of the at least two field devices on the basis of the determined relative positions such that the wireless interfaces of the at least two field devices transmit with a defined phase shift relative to one another in each particular case such that the at least two field devices emit the data packet with a common main radiation pattern that is directed toward the superordinate unit;
   transmitting the data packet to the superordinate unit via the wireless interfaces of the at least two field devices in synchronized fashion; and
   receiving the data packet by the superordinate unit.

2. The method according to claim 1, wherein the data packet is distributed among the at least two field devices according to a star or mesh, or net topology.

3. The method according to claim 1, wherein the wireless interfaces of the at least two field devices are synchronized according to the IEEE 1588 standard.

4. A measuring system, comprising:
   at least two field devices;
   a superordinate unit, wherein each of the at least two field devices and the superordinate unit have a wireless interface; and
   a control unit, wherein the control unit is designed to:
      determine relative positions of the at least two field devices and of the superordinate unit with respect to one another;
      synchronize the wireless interfaces of the at least two field devices on the basis of the determined relative positions such that the wireless interfaces of the at least two field devices transmit with a defined phase shift relative to one another in each particular case such that the at least two field devices emit a data packet with a common main radiation pattern that is directed toward the superordinate unit;
      coordinate the distribution of the data packet among the at least two field devices; and
      transmit the data packet to the superordinate unit via the wireless interfaces of the at least two field devices in synchronized fashion, and
   wherein the superordinate unit is designed to receive the data packet.

5. The measuring system according to claim 4, wherein the at least two field devices each comprise a wired interface for synchronizing the wireless interfaces and/or for distributing the data packet to the at least two field devices.

6. The measuring system according to claim 5, wherein the wired interfaces are based on the PROFIBUS, Highway Addressable Remote Transducer (HART), or an industrial Ethernet protocol.

7. The measuring system according to claim 4, wherein the wireless interfaces are designed to transmit the data packet according to the Wireless-HART, Bluetooth, or a WLAN wireless protocol, and wherein the superordinate unit is designed to receive the data packet on the basis of the corresponding wireless protocol.

8. The measuring system according to claim 7, wherein, for determining relative positions, the at least two field devices and the superordinate unit each include a Global Navigation Satellite System (GNSS) module.

* * * * *